United States Patent
Stevens et al.

(10) Patent No.: US 11,714,801 B2
(45) Date of Patent: Aug. 1, 2023

(54) STATE-BASED QUEUE PROTOCOL

(71) Applicant: Target Brands, Inc., Minneapolis, MN (US)

(72) Inventors: Luis F. Stevens, San Jose, CA (US); Hrishikesh V. Prabhune, Sunnyvale, CA (US); Christopher Fretz, Harleysville, PA (US)

(73) Assignee: Target Brands, Inc., Minneapolis, MN (US)

( * ) Notice: Subject to any disclaimer, the term of this patent is extended or adjusted under 35 U.S.C. 154(b) by 282 days.

(21) Appl. No.: 16/834,938

(22) Filed: Mar. 30, 2020

(65) Prior Publication Data
US 2021/0303551 A1  Sep. 30, 2021

(51) Int. Cl.
*G06F 16/23* (2019.01)
*G06F 9/54* (2006.01)

(52) U.S. Cl.
CPC .......... *G06F 16/2379* (2019.01); *G06F 9/544* (2013.01)

(58) Field of Classification Search
CPC ...... G06F 9/526; G06F 9/544; G06F 16/2379; G06F 16/2336; G06F 16/9014
See application file for complete search history.

(56) References Cited

U.S. PATENT DOCUMENTS

| 8,099,546 | B2 | 1/2012 | Rostedt | |
| 10,860,612 | B2* | 12/2020 | Lee | G06F 16/245 |
| 2011/0131352 | A1 | 6/2011 | Allen et al. | |
| 2015/0234933 | A1* | 8/2015 | Grover | G06F 16/2336 707/800 |
| 2019/0087123 | A1* | 3/2019 | Liljedahl | G06F 3/0656 |
| 2021/0011652 | A1* | 1/2021 | Shu | G06F 3/0679 |

OTHER PUBLICATIONS

Pirkelbauer, Peter et al; A Portable Lock-Free Bounded Queue; No Institute Given, Printed Apr. 25, 2019; 30 Pages.
Johnston, Phillip; Creating a Circular Buffer in C and C++ (/blog/ 2017/4/6/circular-buffers-in-cc); Dated Dec. 19, 2018; 22 Pages.

* cited by examiner

*Primary Examiner* — Marcin R Filipczyk
(74) *Attorney, Agent, or Firm* — Merchant & Gould P.C.

(57) ABSTRACT

Methods and systems for execution of data operations in a queue are described. One method includes loading a pointer to a record in a lock-free ring buffer by an executing thread, as well as calculating an index from the pointer to a record to be processed and obtaining a header of the record to be processed. Based on the header, a state of the record to be processed is determined from among: a filled state, a filling state, a drained state, and a draining state. A candidate header is created which includes an updated state indicating that the record is in use by the executing thread. An atomic operation is performed to update the header of the record to the candidate header. Upon successful completion of the atomic operation to update the header of the record to the candidate header, a data operation is performed on the record.

19 Claims, 8 Drawing Sheets

FIG. 8

STATE-BASED QUEUE PROTOCOL

BACKGROUND

Queue structures may be used to temporarily store data that is provided from a provider process to a consumer process. Typically, processes that are designed to write data into a queue (e.g., producers) are required to reserve queue locations prior to storage of data, to ensure that those processes are not overwriting data that is being read by another process or that the same location is not currently being written to by another process.

In some instances, there are a number of processes that each are configured to read data from a queue for subsequent processing (e.g., consumers). In this context, the consumer processes may be configured to read all data produced by all producer processes, or the consumer processes may be configured such that only one consumer process will read data from a particular data record (e.g., each consumer will cooperate to ensure only one consumer accesses each record). In this second context in which each consumer process reads different data from the queue, the consumer processes will also reserve queue locations during a read process associated with those locations. This can be accomplished, for example, using pointers that are associated with each producer and consumer process.

Although such techniques allow for proper queue management, implementing a record locking scheme is suboptimal because it may take significant time to identify an appropriate record for a process to access, establish a lock on that record, and then perform a read or write process on the record. In high-performance computing applications, such locks may significantly affect performance of the overall queue, and may therefore be unsuitable. Still further, even when used, it may be unclear how much time a record may be reserved, and therefore it may be difficult to predict, from the perspective of other processes, how long a lock may remain in place, leading to significant inefficiencies in terms of record lock checking and wait/retry processes performed by all other processes.

SUMMARY

In general, the present disclosure relates to a state-based queue protocol in which a state of each record in the queue is reflected in a record header. Atomic operations are used to change the state of the queue record by changing the record header to ensure no collision occurs in high-performance computing environments. Accordingly, in circumstances where multiple threads are competing to obtain read or write access to a particular queue header, unsuccessful threads may be able to re-initiate obtaining a record from the queue, and will, as part of their queue access protocol, advance to a next-available record, thereby minimizing wait operations performed by competing queue threads.

In a first aspect a system includes one or more processors; and a memory storing instructions. When executed by the one or more processors, the instructions cause the one or more processors to: load a pointer to a record in a buffer by an executing thread, the lock-free ring buffer having a plurality of records located at corresponding index values; calculate an index from the pointer to a record to be processed; obtain a header of the record to be processed; based on the header, determine a state of the record to be processed, the state selected from among: a filled state, a filling state, a drained state, and a draining state; create a candidate header including an updated state of the record to be processed, the updated state indicating that the record is in use by the executing thread; perform an atomic operation to update the header of the record to the candidate header; and upon successful completion of the atomic operation to update the header of the record to the candidate header, perform a data operation on the record.

In a second aspect, a method of storing data into a queue is disclosed. The method includes loading a shared producer pointer by a producer thread, the lock-free ring buffer having a plurality of records located at corresponding index values, the shared producer pointer being useable by a plurality of producer threads including the producer thread, calculating an index from the shared producer pointer to a record into which data is to be stored, and obtaining a header of the record. The method further includes, based on the header, determining a state of the record to be processed, and creating a candidate header including an updated state of the record to be processed, the updated state indicating that the record is in use by the producer thread. The method also includes performing an atomic operation to update the header of the record to the candidate header, and, upon successful completion of the atomic operation to update the header of the record to the candidate header, performing a storage operation in which the producer thread stores data into the record.

In a third aspect, a method of retrieving data from a queue is disclosed. The method includes loading a shared consumer pointer by a consumer thread, the lock-free ring buffer having a plurality of records located at corresponding index values, the shared consumer pointer being useable by a plurality of consumer threads including the consumer thread. The method further includes calculating an index from the shared consumer pointer to a record into which data is to be stored, obtaining a header of the record, and, based on the header, determining a state of the record to be processed. The method also includes creating a candidate header including an updated state of the record to be processed, the updated state indicating that the record is in use by the consumer thread. The method further includes performing an atomic operation to update the header of the record to the candidate header, and, upon successful completion of the atomic operation to update the header of the record to the candidate header, performing a read operation in which the consumer thread reads data from the record.

BRIEF DESCRIPTION OF THE DRAWINGS

The same number represents the same element or same type of element in all drawings.

DETAILED DESCRIPTION

As briefly described above, embodiments of the present invention are directed to a memory structure and queueing protocol for queueing data. In particular, the example embodiments discussed herein are particularly useful in high-performance computing scenarios in which a large number of concurrently-executing threads wish to access common memory, and to cooperate in data processing. In such instances, a queue having minimal queueing locks to ensure synchronization is highly desirable.

In accordance with the present disclosure, a state-based queue protocol is described for use in conjunction with a lock-free queue (e.g., a lock-free ring buffer) in which a state of each record in the queue is reflected in a record header. Atomic operations are used to change the state of the queue record by changing the record header to ensure no collision occurs in high-performance computing environments. Accordingly, in circumstances where multiple threads are competing to obtain read or write access to a particular queue header, unsuccessful threads may be able to re-initiate obtaining a record from the queue, and will, as part of their queue access protocol, advance to a next-available record, thereby minimizing wait operations performed by competing queue threads.

In some instances, the record header for each queue record may also store a last-known producer or consumer pointer. In such instances, the state of the queue record and the most-recent header may be checked concurrently in the atomic (e.g., single-cycle) operation, thereby resolving both (1) whether the queue record is occupied by a thread, and (2) whether that queue record is a record that was recently locked/written based on the pointer value (thereby detecting possible ABA problems that might otherwise occur in a lock-free data structure).

Example Environment

Figure 1:
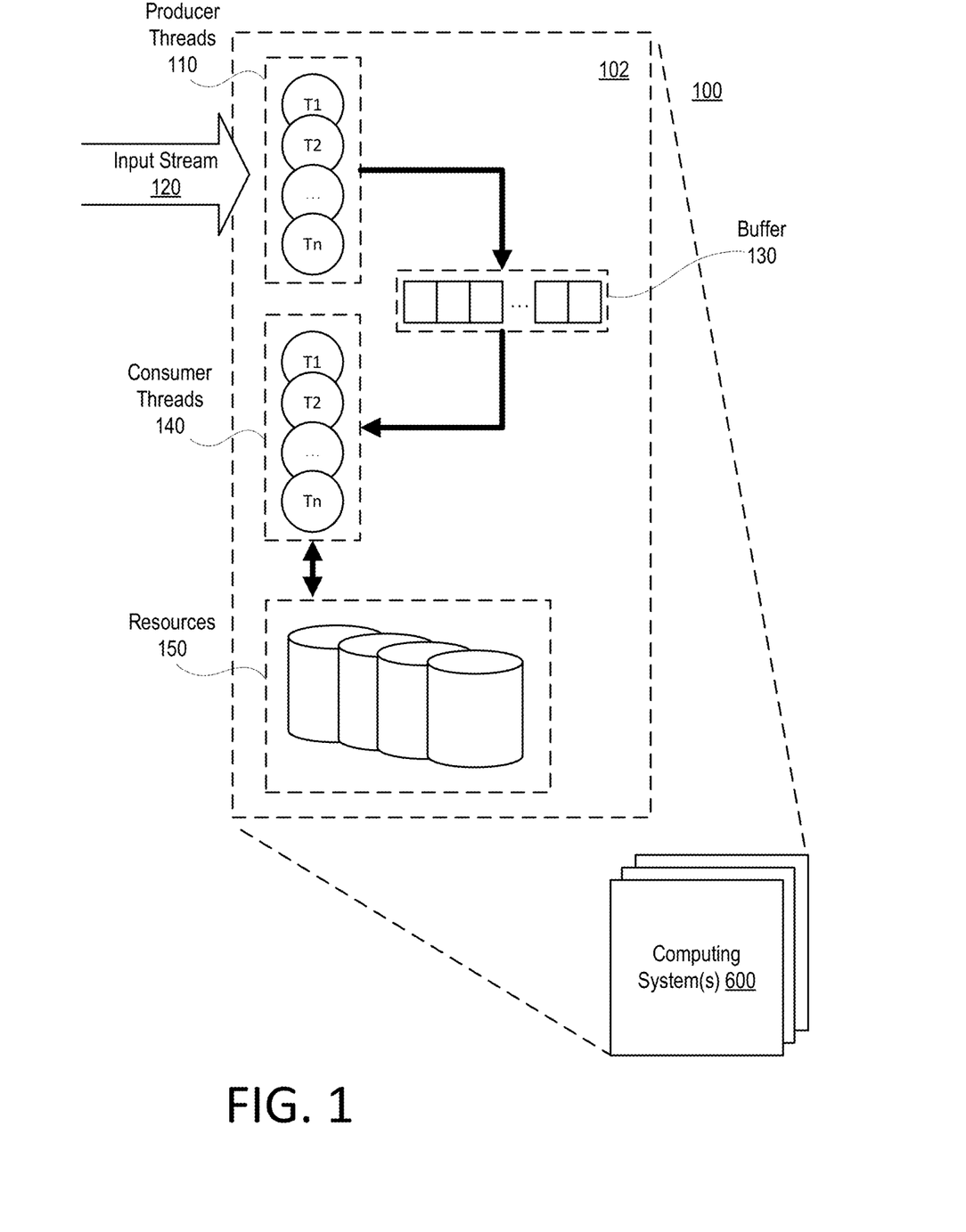
FIG. 1 illustrates an example computing environment that can benefit from use of technologies described herein.

FIG. 1 illustrates an example computing environment 100 that can benefit from use of technologies described herein. The computing environment 100 is provided by one or more computing systems 600 (described in more detail in FIG. 8). In many examples, the one or more computing system 600 are each one more physical or virtual computers having memory and one or more processors configured to execute instructions stored in the memory. The one or more computing systems 600 can be configured for particular tasks. In an example, the computing systems 600 can be high-performance computing systems having special-purpose hardware. The special-purpose hardware can include server- or workstation-grade CPUs (Central Processing Units) supporting high core counts, supporting large amounts of system memory, having large caches, having error correcting capabilities, other features, or combinations thereof. The special purpose hardware can include GPUs (Graphics Processing Units), AI (Artificial Intelligence) accelerating hardware (e.g., AI-focused processors or co-processors), error-correcting memory, other hardware, or combinations thereof. Further, one or more features can be provided as physical or virtual machines.

The computing environment 100 includes a producer-consumer workflow 102 having one or more producer threads 110 running on the one or more computing systems 600 (e.g., in parallel). The producer threads 110 each produce data to a buffer 130 for consumption by one or more consumer threads 140. In the illustrated example, the producer threads 110 produce data based, in part, on an input stream 120. The consumer threads 140 run on the one or more computing systems (e.g., in parallel), remove data from the buffer 130, and process the data to produce a result. During this process, one more resources 150 can be used by the consumer threads 140. The one or more resources 150 can include one or more databases, data structures, or other resources. The resources 150 may, but need not, be provided by the one or more computing systems 600 (e.g., one or more of the resources can be provided by a remote server or other computer).

In example implementations, the buffer 130 stores a plurality of records. The buffer 130 may be constructed in a particular way to accommodate specific data usage models. In particular, in example embodiments, the buffer 130 may be constructed as a lock-free ring buffer that is accessible by any or all of the producer threads 110 and consumer threads 140. In one example embodiment, the buffer 130 receives data written to it by any of the producer threads 110, and that data may be retrieved, or read, by any one of the consumer threads 140. In this context, any consumer thread may read any data from the buffer 130, irrespective of which producer thread 110 stored that data in the buffer. Additionally, each record in the buffer 130 is only required to be read by one consumer thread 140 (i.e., as compared to all consumer threads reading all data from the buffer). Accordingly, the producer threads 110 will cooperate with each other to not overwrite valid data that has not yet been read by a consumer thread 140, and the consumer threads will cooperate with each other to not read the same data.

Increases in the amount of data in the input stream 120, increases in the complexity of processing required by the consumer threads 140, and the demands by people or systems relying on the producer-consumer workflow 102, can likewise increase the importance of ensuring high performance of the system. While computing resources provided by the computing system 600 can be scaled up or down from a pool of available computing resources (e.g., processing speed, memory, cache space, energy efficiency), the computing resources are finite, thus improvements to how the data structures and other aspects are processed can yield improvements to the functioning of the one or more computing systems 600.

Techniques that may be common in traditional computing operations (e.g., blocking processing to wait for other programs to finish a task or otherwise synchronize processing) are often unsuitable in operating in such High-Performance Computing (HPC) applications. In addition, HPC systems often use many computing threads running on multiple different processors. As the number of threads increases, so too do difficulties in synchronizing processing and maximizing the use of resources. These difficulties are explained, in part, by what is known in the art as "Amdahl's Law", which predicts that theoretical speedups of parallel processing are limited by the ability of the underlying processes to be parallelized. Improvements to HPC technologies can generally relate to improving the ability of processes to be parallelized and run in HPC settings.

Various kinds of queueing structures are commonly used in programming contexts. However, traditional implementations of queueing structure are not well-suited for use in HPC applications. For example, traditional queue management techniques (particularly for circular queues) are designed to ensure that all consumers of queued data are able to access that data until such time as the data is not required by any consumer. In cases where any consumer may consume any data from a queue (and where that data is only required to be consumed by a single consumer), a consumer that stalls or is otherwise delayed does not affect the overall queue size greatly, because other consumers may continue to pull and process data from the queue. However, in circumstances where all consumers must consume all data (e.g., in situation such as described above where all consumer threads 140 read all data from a dedicated buffer 130), in the event one such consumer stalls, queue entries may be retained indefinitely (or at least for as long as the consumer is stalled), because those entries are not yet read by the consumer. A result of such a stall could be that, because the producer thread continues to publish data to the buffer 130, the buffer may quickly fill, and therefore the producer may be prevented from storing further data in the buffer until the consumer is either able to recover and continue processing data, or is terminated. This has the additional effect of potentially stalling other consumer threads, which would wait for additional data published by the producer.

Queueing techniques disclosed herein overcome this challenge through a queue interaction protocol used by producer threads and consumer threads to quickly assess and update a record status in a lock-free buffer, with the record status being indicative of whether each record is ready for use by a producer or consumer, or whether currently in use by a producer or consumer. As further discussed below, although the producer threads 110 and consumer threads 140 are discussed as "cooperating" with one another, it is noted that in the context of the present disclosure, rather than each thread interacting with other executing threads, to avoid such overhead, each thread instead interacts with the buffer 130, which retains a state of each record. While each thread is capable of updating a pointer into the buffer 130, rather than checking both a status of the pointer and the record, both record and pointer status are embedded within a record header to allow for efficient assessment of the status of a record in the buffer. Accordingly, an atomic operation (e.g., an operation requiring only one CPU cycle) may be used to perform this assessment.

Queue Structure

Figure 2:
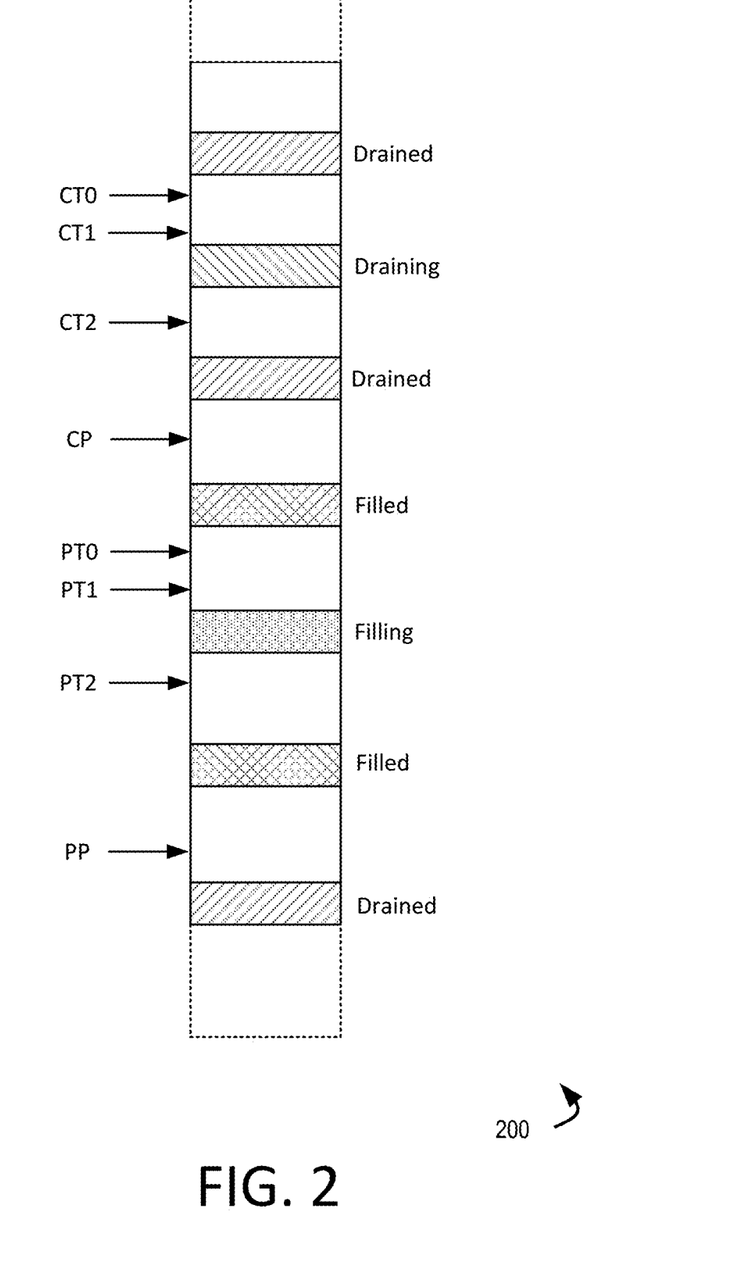
FIG. 2 illustrates an example queue with which aspects of the present disclosure can be implemented.

FIG. 2 illustrates an example logical diagram of a queue 200 useable to implement aspects of the present disclosure. The queue 200 may be used, for example, to implement buffer 130 seen in FIG. 1. In example embodiments, the queue 200 may be implemented as a lock-free ring buffer accessible by any of a plurality of executing threads on a computing system.

In the example shown, the queue 200 is implemented in a way that allows a plurality of producer threads (also referred to as producers, or publishers) to access records in the buffer concurrently, and to additionally allow a plurality of consumer threads (also referred to as consumers, or subscribers) to access records concurrently. In general, and as noted above, each producer may independently store data into the queue 200, while each consumer may also independently read data from the queue 200. By independently, it is meant that each producer may store different data into the queue, and each consumer may read different data from the queue, and that there need be no correlation between any particular producer and consumer.

As illustrated in FIG. 2, the queue 200 includes a plurality of records 202, each of which has a defined state. The defined states identify whether the record in the queue 200 is able to be accessed by a producer or consumer. In example embodiments, the defined states can include a drained state, a filled state, a filling state, and a draining state. For example, a drained state may indicate that a record has been read by a consumer, and therefore is available to receive data written by a producer. A filled state may indicate that a record has been written to by a producer, and is ready to be accessed by a consumer. A filling state may indicate that a record is in the process of being written to by a producer, and a draining state may indicate that a record is in the process of being read by a consumer. Accordingly, filled and drained states indicate that a given record is not currently being accessed by any thread, while filling and draining states indicate that a record is in use (e.g., being read/written) by a producer or consumer, respectively.

In the example shown, the queue 200 also has a producer pointer 204 (labeled "PP") and a consumer pointer 206 (labeled "CP"). The producer pointer 204 defines an approximate location in the queue 200 that represents a starting point at which producer threads may attempt to write to queue records. In the example shown, the producer pointer is maintained "ahead" of all of the producer threads, and defines a context that may be shared among the producers. Accordingly, each time a producer successfully writes to a record, that producer may advance the producer pointer, such that the producer pointer may indicate a starting point at which producers may attempt to identify a free record (e.g., a record in a "drained" state) that is available to be written to.

In the example shown, three producer threads (PT0-PT2) are shown, each of which being indexed to a location offset from the producer pointer 204. As discussed in further detail below, each producer thread may access or write data to a record that is offset by an index from the producer pointer. In the example show, producer thread PT2 has filled a record, while producer threads PT0, PT1 are indexed to a same record. In the example shown, PT0 and PT1 may attempt to change a state of a record to a "filling" state at the same time. Details regarding resolution of such collisions are provided below in conjunction with FIGS. 4-5. However, concurrently, producer thread PT2 may identify a next subsequent record that can be filled, and transition it through a "filling" state to a "filled" state when writing is complete. Accordingly, one of the producer threads PT0, PT1 may determine that it is unsuccessful in transitioning the state of the record at the location shown for pointers PT0, PT1, and will instead access a next record upon advancement of the producer pointer 204 (e.g., the next record having the "drained" state.

The consumer pointer 206 similarly defines an approximate location in the queue 200 that represents a starting point at which consumer threads may attempt to read from queue records. In the example shown, the consumer pointer is maintained "ahead" of all of the consumer threads, and defines a context that may be shared among the consumers. Accordingly, each time a consumer successfully reads from a record, that consumer may advance the consumer pointer, such that the consumer pointer may indicate a starting point at which the consumers may attempt to identify a record ready to be read (e.g., a record in a "filled" state).

In the example shown, three consumer threads (CT0-CT2) are shown, each of which is indexed to a location offset from the consumer pointer 206. As with the producer pointer 204, each consumer thread may access or read data from a record that is offset by an index from the consumer pointer. In the particular state shown in FIG. 2, consumer thread CT2 has read a record, thereby transitioning that record to a "drained" state. Consumer threads CT0, CT1 may "collide" at a record by both receiving the same index offset from the consumer pointer. Details regarding resolution of such collisions are provided below in conjunction with FIGS. 6-7.

Accordingly, as illustrated in FIG. 2, although a single producer pointer 204 and single consumer pointer 206 are shown, a plurality of locations of producers and consumers are shown. Of course, although the producer pointer 204 and consumer pointer 206 may be used in some cases to identify a general location in the queue where data may be read from/written to, those pointers do not necessarily define record locations that may be available to be read or written;

ultimately, as discussed below, whether a record is available to be read or written (or is in the process of being read/written) is defined by a state of the record reflected in a record header associated with that record.

Figure 3:
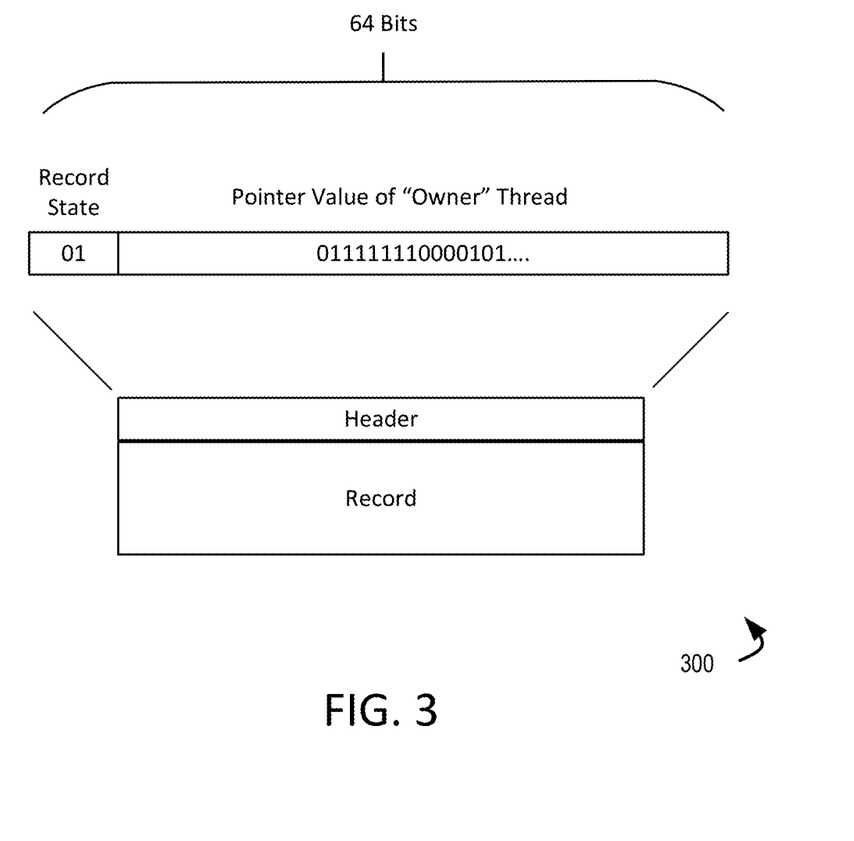
FIG. 3 illustrates an example queue record including a header useable to track a state of the queue record, according to an example embodiment.

FIG. 3 illustrates an example queue record 202 including a header 302 useable to track a state of the queue record, according to an example embodiment. In the example shown, each queue record 202 has a header 302 and a body 304. The header 302 can be sized to store at least a state of the record and optionally information useable to ensure that no read or write errors occur due to ABA problems that might otherwise occur in a lock-free queue.

In the example shown, the header 302 is sized to be accessed and modified in a single, atomic operation (e.g., an operation occurring in a single instruction). For example, on certain instruction set architectures, the header 302 may be constructed to be a 64-bit word (one quad-word, for a 16 bit word length). In the example shown, the header 302 includes a plurality of bits useable to define a state of the queue record 202, and a remainder of the bits useable to store a pointer value of the producer or consumer pointer that was then-current when the record last changed state (e.g., when read by a consumer or written to by a producer). In the example above, where four states are used, two bits of the header 302 may be used to define a current state of the queue record 202, and a remaining set of bits (e.g., 62 bits) may be used to store the pointer value. Other numbers of bits may be used depending on the number of states and pointer values that are utilized.

The body 304 is of generally arbitrary size, and is configured to receive data from producers and be readable by consumers as noted above. The body 304 may be of arbitrary size; in example embodiments, each body 304 of each of the records in a queue (such as queue 200) is of a same size. The body need not be readable or writable using atomic transactions; as noted below, transactions in which producers and consumers access the body will typically occur when the record 202 is in a reserved state by a particular thread (e.g., a "filling" or "draining" state).

Queue Access Protocols

Figure 4:
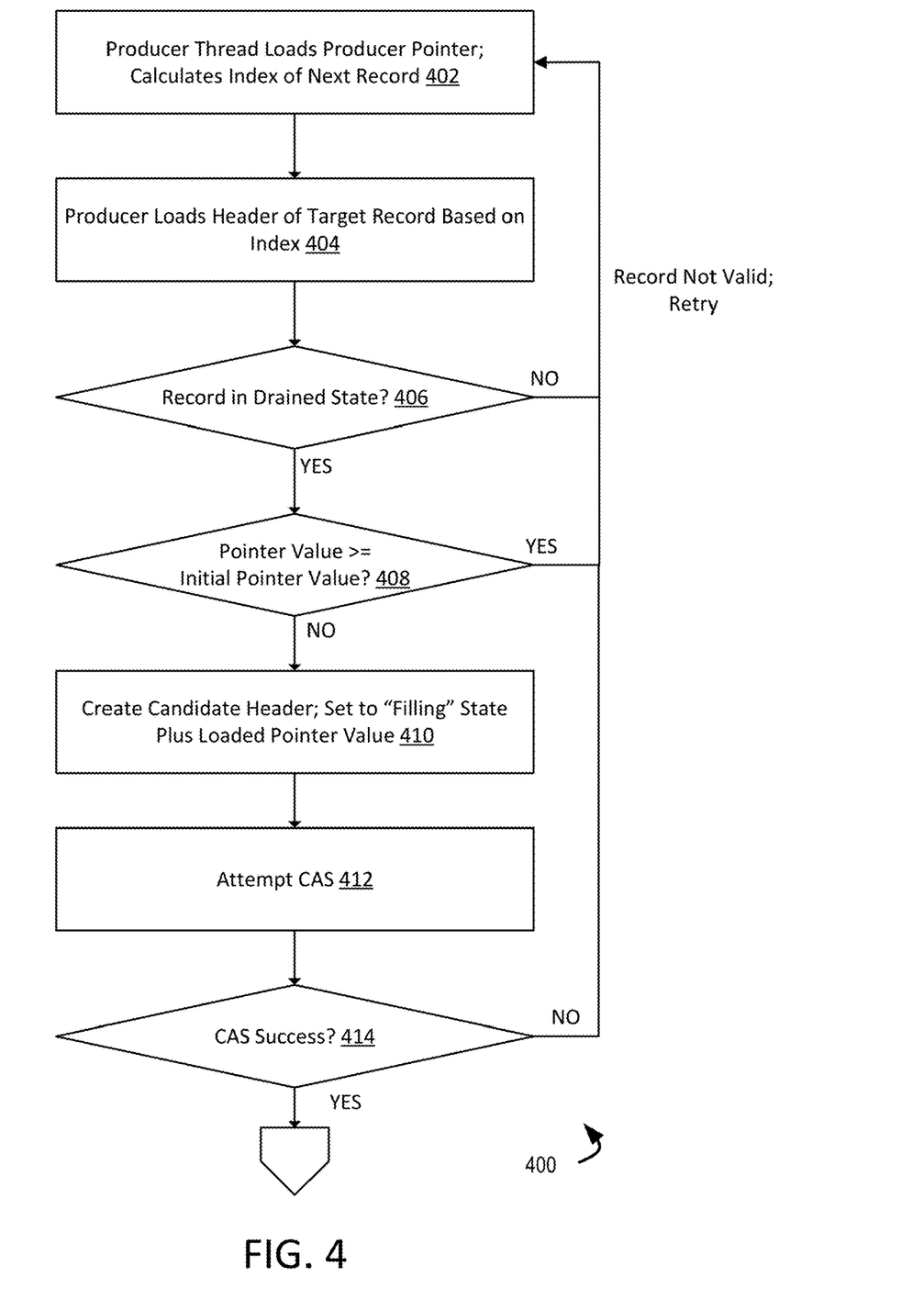
FIGS. 4-5 illustrates a flowchart of a process of storing data in the queue of FIG. 2 by a publisher or producer of data.
Figure 5:
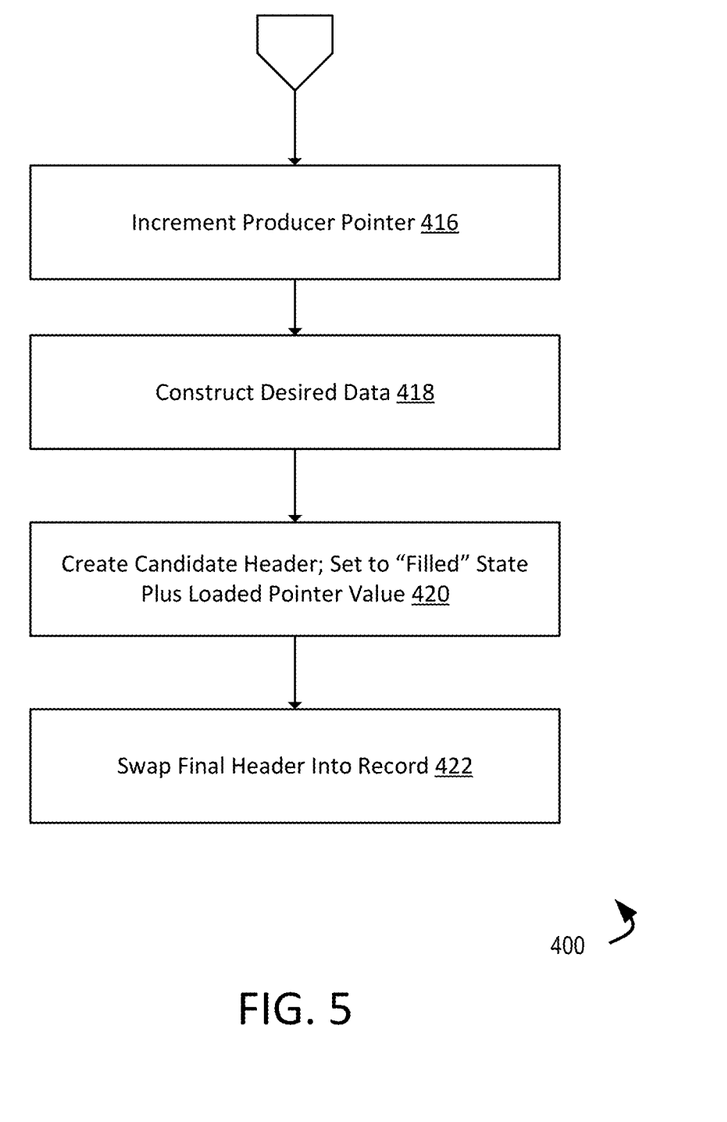

FIGS. 4-5 illustrates a flowchart of a process 400 of storing data in the queue of FIG. 2 by a publisher of data. The process 400 may be performed, for example, by any of the producer threads 110 accessing buffer 130 for purposes of storing data. Additionally, as noted below, each of a plurality of producer threads may perform the process 400 concurrently.

In the example shown, a producer (e.g., producer thread) can load the producer pointer (PP) and calculate an index of a next record to be accessed (step 402). Generally, the index of the next record will be calculated by determining an index value of a next record to be produced (written to), for example by starting at a last known record that was accessed by any producer.

The producer loads a header of the target record that is identified by the index (step 404). As illustrated in FIG. 3, each record has a header, which may be a data segment (e.g., a quad word, or 64 bit word) located at the index to the record. A two-bit segment is then read to determine a state of the target record from among the plurality of states (e.g., drained, filled, filling, draining).

The producer then determines whether the record is in the "drained" state based on the header (operation 406). If the record is not in the "drained" state, the record is not available to be written to by the producer. Accordingly, operational flow returns to step 402 to restart the process 400 for that consumer. This may occur because, for example, another producer thread has already accessed the record and updated its header, and may be in the process of writing data to the record. Accordingly, by returning to step 402, the producer will reload the producer pointer (which may be updated by a different thread) or may calculate a different index (e.g., to identify a different offset from the producer pointer). Therefore, during the subsequent iteration, the producer will typically access a different record as compared to an initial iteration through the process 400.

If the record is in the drained state, the producer also determines whether the pointer value in the record is greater than or equal to an initial pointer value (operation 408). If the pointer value is greater than an initial pointer value, then it is determined that the pointer value in the record was previously edited, for example by another producer and consumer which most recently edited the record, and caused the record to cycle through the various states. In this case, an ABA problem may exist with respect to the record. Accordingly, the record is considered invalid, and operational flow returns to step 402 to reload a new pointer and index to a new record for writing by the producer.

If the pointer value is not greater than the initial pointer value of the producer pointer, the record is available to be written to by the producer. Accordingly, operation proceeds to allow the producer to create a new candidate header for the record (step 410). This includes creating a new candidate header that identifies the record as being in a "filling" state. Optionally, the producer also includes in the candidate header the updated pointer value, concatenated with the state information, for storage in the header.

In the example shown, once the candidate header is constructed, the producer attempts to perform a compare-and-swap (CAS) operation to replace the header in the record with the candidate header (step 412). The compare-and-swap operation is an atomic operation (e.g., able to be executed in a single CPU cycle) that compares the contents of a memory location with a given value, and if the values match, will replace that value with a new, given value. In this case, the existing header is compared to the loaded header value and the CAS operation is used to determine if the header of the record has changed during the time the status of the record is assessed and the new candidate header is constructed (e.g., during operations 406-410).

If the header has changed between a time it is loaded (at step 404) and during the CAS operation (step 412), then the CAS operation will fail, and operational flow (at operation 414) will cause the process 400 to restart. This is because, in the case of a CAS failure, some other producer may have successfully performed a CAS operation in the interim, and therefore has updated the header to, e.g., a "filling" state (and may have updated the producer pointer as well). Accordingly, if the CAS operation fails, operational flow will restart at step 402 within the process 400, to allow the producer to re-read the producer pointer and recalculate the offset to the new record to be used by that producer.

If the CAS operation does not fail, operational flow proceeds to allow the producer to perform a data operation (e.g., a write operation within the record). An example of steps included in such a data operation are shown in the continued execution of process 400 seen in FIG. 5.

Referring now to FIG. 5, a continuation of the process 400 is shown in which a data operation may be performed. The data operation, in the context of process 400, may be a write operation into a queue, such as queue 200, performed by a producer (e.g., producer thread 110). In general, upon successful completion of the CAS operation, the producer has reserved the record by placing the record into a filling state, and may modify the contents of the record.

In the example shown, the data operation includes incrementing a producer pointer (step 416). This can include, for example, updating the producer pointer to advance by one increment (e.g., one record). Although the producer may be offset from the producer pointer, since the producer may be operating in parallel with other producers of which are affecting other records of the queue, the producer pointer is simply maintained by advancing that pointer by one record each time one producer thread successfully transitions a record to the filling state, indicating that the producer will write data to that record.

In the example shown, the producer also constructs the data to be stored in record (step 418). This can be any data desired to be stored within record, but is generally constructed such that it is of equivalent length to the length of the record such that a copy directly into memory in the record location may take place. Upon completion, this constructed data may be written into memory at the location of the record.

The producer also creates a candidate header for the record (step 420). The candidate header corresponds to a header that will be applied upon completion of the write operation into the queue. The candidate header, in this example, includes a further updated state that reflects completion of the write operation. For example, the candidate header can identify the state of the record as "filled". The candidate header can also include the incremented pointer calculated in step 416. Upon completion of construction of the candidate header, that candidate header is swapped into the record, e.g., through use of a further CAS instruction (step 422). Accordingly, writing to the record by the producer is completed, and the header of the record is updated with an updated pointer and signifying that the record is in a "filled" state.

Referring to FIGS. 4-5 generally, it is noted that while the CAS operation performed in steps 412, 422 are generally atomic operations, the writing, or storing, operation of step 418, and indeed the combination of data operations seen in FIG. 5 overall, need not be atomic. This is because the header on the record that is currently being acted on by a given producer is in a "filling" state, and therefore other producers that may attempt to access and gain control of the record will also execute the process 400. Those other producers will determine that the record is not in a "drained" state (at operation 406) because it is currently being filled by another producer. As such, those other threads will reload a producer pointer and recalculate an index to a record to be accessed. Because the producer thread that caused the record to enter a "filling" state will, shortly thereafter, increment the producer pointer and/or index, the next time another producer loads the producer pointer, that other producer will attempt access of a different record that is potentially not already in the "filling" state (and ideally for that other producer, will be in a "drained" state indicating that it is available).

Figure 6:
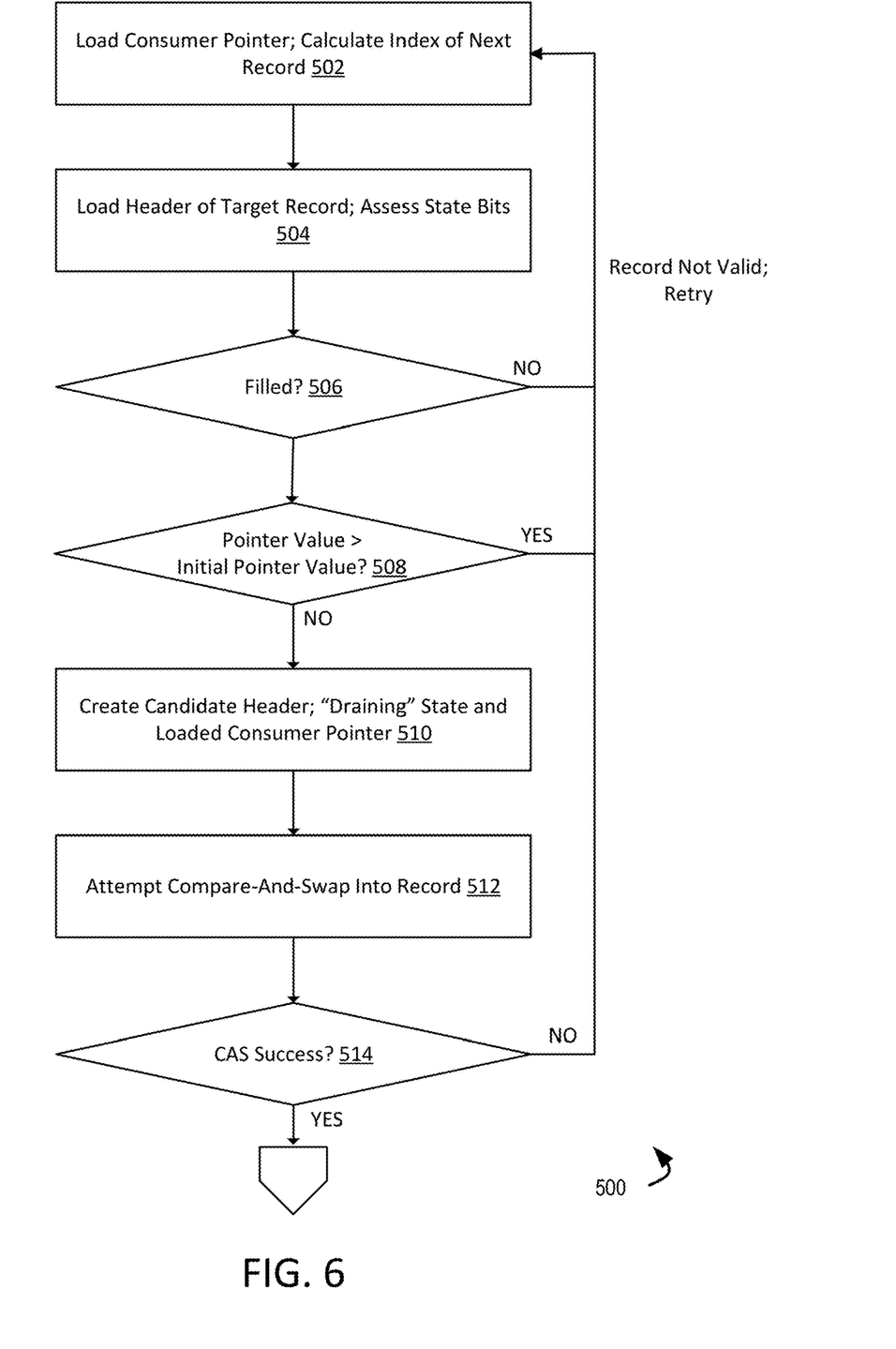
FIG. 6-7 illustrates a process of reading data from the queue of FIG. 2 by a subscriber to or consumer of the data stored in the queue.
Figure 7:
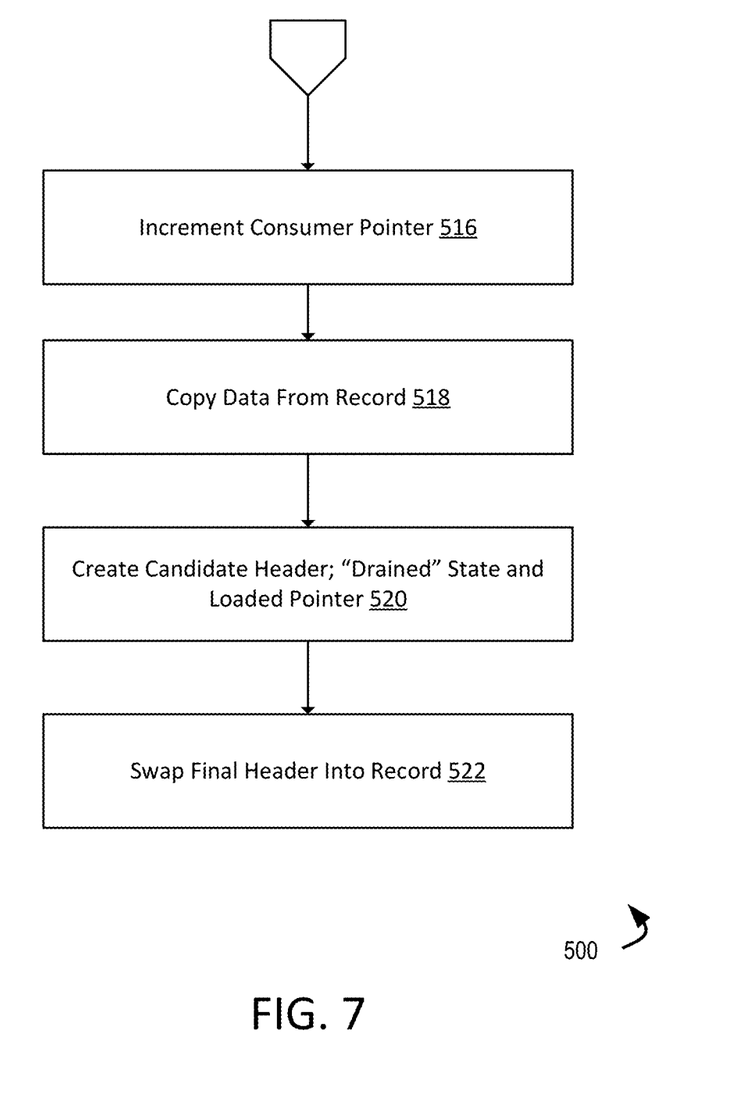

Referring now to FIGS. 6-7, a process 500 of reading data from the queue of FIG. 2 by a consumer or subscriber to the data stored in the queue is shown, according to an example embodiment. The process 500 may be performed, for example, by any of the consumer threads 140 accessing buffer 130 for purposes of reading data.

In general, the process 500 is analogous to that of process 400 seen in FIGS. 4-5, but from the perspective of a consumer thread. Generally, a consumer can load a consumer pointer (CP) and calculate an index of a next record to be accessed (step 502). The index of the next record will be calculated by determining an index value of a next record to be consumed (e.g., read from), for example by starting at a last known record that was accessed by any consumer.

The consumer loads a header of the target record that is identified by the index (step 504). The state bits of the header (e.g., the two bits of a header used to designate a state of the record) are read to determine a state of the target record (e.g., drained, filled, filling, draining).

The consumer then determines whether the record is in a "filled" state based on the header (operation 506). If the record is not in the "filled" state, the record is not available to be read from by the consumer. Accordingly, operational flow returns to step 502 to restart the process 500 for that consumer. This may occur because, for example, another consumer thread has already accessed the record and updated its header, and may be in the process of reading data from the record. Accordingly, by returning to step 502, the consumer will reload the consumer pointer (which may be updated by a different thread) or may calculate a different index (e.g., to identify a different offset from the consumer pointer). Therefore, during the subsequent iteration, the consumer will typically access a different record as compared to an initial iteration through the process 500.

If the record is in the filled state, the consumer then also determines whether the pointer value in the record is greater than an initial pointer value (operation 508). If the pointer value is greater, this would be the result of an update to the pointer value by another consumer after the current consumer read the consumer pointer. Accordingly, the consumer pointer held by the consumer is no longer valid, and necessarily the other consumer had access to the record after the consumer pointer was read (at step 502). Therefore, operational flow returns to step 502 to re-read the consumer pointer and recalculate an index, thereby accessing a new and/or different record.

If the record is in the filled state and the pointer value in the record is not greater than the initial pointer value, the consumer will proceed to create a candidate header for the record (step 510). The candidate header for the record can include the current consumer pointer value concatenated with an indication that the record will be in a "draining" state. For example, a two-bit state code indicative of a draining state can be combined in a single quad word (64 bit) value with the loaded value of the consumer pointer.

Once the candidate header is created, the consumer may proceed to attempt a compare-and-swap (CAS) operation to replace the existing header of the record with the candidate header (step 512). As noted above, the compare-and-swap operation provides an atomic operation that compares the existing header to an expected value of the existing header (e.g., as loaded in step 504). If those values are the same (e.g., no other consumer has changed the header since operation 504, when the current consumer loaded the header), the header will be updated with the candidate header.

If the compare-and-swap instruction fails (e.g., due to mismatch, as determined at operation 514), operational flow returns to step 502, at which the consumer will reload a different record based on a re-assessment of the consumer pointer and recalculation of an index to a next record. This will occur, for example, if another record concurrently was indexed to the same record and completed its CAS operation previously to the CAS of step 512. Accordingly, the consumer will proceed to attempt update of a header of a next record, and will then read from that next record if the CAS operation on that record is successful.

Of course, if the CAS operation is performed successfully (as determined at operation 514), operational flow proceeds to allow the consumer to perform a data operation on the record. In this instance, the data operation can be a data read operation from the record, as illustrated in FIG. 7.

Referring now to FIG. 7, a continuation of the process 500 is shown in which a data operation may be performed. The data operation, in the context of process 500, may be a read operation from a queue, such as queue 200, performed by a consumer (e.g., consumer thread 140). In general, upon successful completion of the CAS operation of step 512, above, the consumer has reserved the record by placing the record into a draining state, and may reliably read the record without risk that another thread will modify (and therefore invalidate) the record concurrently.

In the example shown, the data operation includes incrementing a consumer pointer (step 516). This can include, for example, updating the consumer pointer to advance by one increment (e.g., one record). Although the consumer may be offset from the consumer pointer, since the consumer may be operating in parallel with other consumers of which are affecting other records of the queue, the consumer pointer is simply maintained by advancing that pointer by one record each time one consumer thread successfully transitions a record to the draining state, indicating that the consumer will read (or is reading) data from that record.

In the example shown, the consumer next copies data from the record (step 518). The consumer also creates a candidate header for the record (step 520). The candidate header corresponds to a header that will be applied upon completion of the read/copy operation. The candidate header, in this example, includes a further updated state that reflects completion of the read operation. For example, the candidate header can identify the state of the record as "drained". The candidate header can also include the incremented pointer calculated in step 516. Upon completion of construction of the candidate header, that candidate header is swapped into the record, e.g., through use of a further CAS instruction (step 522). Accordingly, reading from the record by the consumer is completed, and the header of the record is updated with an updated pointer and signifying that the record is in a "drained" state. The record is therefore prepared to be written to when the producer pointer 204 increments to (or wraps around the circular buffer to) arrive at that record.

Referring to FIGS. 6-7 generally, it is noted that while the CAS operation performed in steps 512, 522 are generally atomic operations, the writing, or storing, operation of step 518, and indeed the combination of data operations seen in FIG. 7 overall, need not be atomic. As with the write operations of FIGS. 4-5, in the case of read operations performed by a consumer, only the update of the record header is performed using an atomic operation, since success/failure of that operation will reliable both (1) determine whether the particular consumer has access to the record in the queue and (2) update the header to the record to change a state of the record, and its resultant availability to other consumers and/or producers.

Computing System

Figure 8:
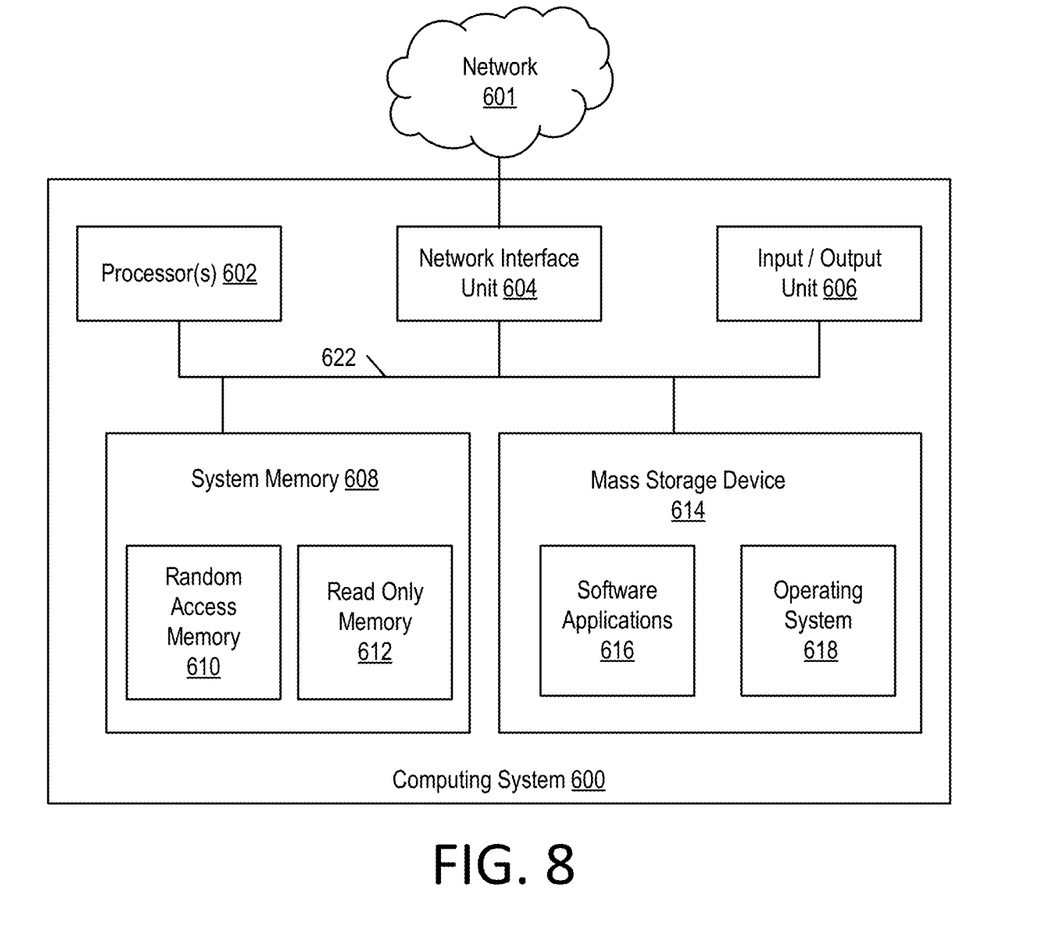
FIG. 8 illustrates an example block diagram of a computing system.

FIG. 8 illustrates an example block diagram of a virtual or physical computing system 600. One or more aspects of the computing system 600 can be used to implement the queue 200, store instructions described herein, and preform operations described herein.

In the embodiment shown, the computing system 600 includes one or more processors 602, a system memory 608, and a system bus 622 that couples the system memory 608 to the one or more processors 602. The system memory 608 includes RAM (Random Access Memory) 610 and ROM (Read-Only Memory) 612. A basic input/output system that contains the basic routines that help to transfer information between elements within the computing system 600, such as during startup, is stored in the ROM 612. The computing system 600 further includes a mass storage device 614. The mass storage device 614 is able to store software instructions and data. The one or more processors 602 can be one or more central processing units or other processors.

The mass storage device 614 is connected to the one or more processors 602 through a mass storage controller (not shown) connected to the system bus 622. The mass storage device 614 and its associated computer-readable data storage media provide non-volatile, non-transitory storage for the computing system 600. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 600.

According to various embodiments of the invention, the computing system 600 may operate in a networked environment using logical connections to remote network devices through the network 601. The network 601 is a computer network, such as an enterprise intranet and/or the Internet. The network 601 can include a LAN, a Wide Area Network (WAN), the Internet, wireless transmission mediums, wired transmission mediums, other networks, and combinations thereof. The computing system 600 may connect to the network 601 through a network interface unit 604 connected to the system bus 622. It should be appreciated that the network interface unit 604 may also be utilized to connect to other types of networks and remote computing systems. The computing system 600 also includes an input/output controller 606 for receiving and processing input from a number of other devices, including a touch user interface display screen, or another type of input device. Similarly, the input/output controller 606 may provide output to a touch user interface display screen or other type of output device.

As mentioned briefly above, the mass storage device 614 and the RAM 610 of the computing system 600 can store software instructions and data. The software instructions include an operating system 618 suitable for controlling the operation of the computing system 600. The mass storage device 614 and/or the RAM 610 also store software instructions, that when executed by the one or more processors 602, cause one or more of the systems, devices, or components described herein to provide functionality described herein. For example, the mass storage device 614 and/or the RAM 610 can store software instructions that, when executed by the one or more processors 602, cause the computing system 600 to receive and execute managing network access control and build system processes.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of queueing structures, technologies disclosed herein are applicable to data structures generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A system comprising:
one or more processors; and
a memory storing instructions that, when executed by the one or more processors, cause the one or more processors to:
concurrently perform one or more data operations on one or more of a plurality of records in a buffer, wherein performing a data operation on a record in the buffer includes:
load a pointer to the record in the buffer by an executing thread, the buffer comprising a lock-free ring buffer having the plurality of records located at corresponding index values;
calculate an index from the pointer to the record to be processed;
obtain a header of the record to be processed;
based on the header, determine a state of the record to be processed, the state selected from among a plurality of states, including: a filled state, a filling state, a drained state, and a draining state,
wherein the state of the record transitions cyclically among the plurality of states, wherein drained state is followed by the filling state, the filling state is followed by the filled state, and the filled state is followed by the draining state; and
wherein the plurality of records includes a first record with a first state and a second record with a second state each from among the plurality of states, and wherein the first state is different from the second state;
create a candidate header including an updated state of the record to be processed, the updated state indicating that the record is in use by the executing thread;
perform a compare-and-swap (CAS) atomic operation to update the header of the record to the candidate header; and
upon successful completion of the atomic operation to update the header of the record to the candidate header, perform the data operation on the record.

2. The system of claim 1, wherein the instructions further cause the one or more processors to: upon completion of the data operation, update the header of the record to a third state different from the state and the updated state.

3. The system of claim 2, wherein the third state indicates that the record is not in use by any executing thread.

4. The system of claim 1, wherein the instructions further cause the one or more processors to: upon failure of the atomic operation, reload an updated version of the pointer, the updated version of the pointer identifying a second record in the buffer different from the record.

5. The system of claim 1, wherein the instructions cause the one or more processors to: implement a plurality of producer threads and a plurality of consumer threads each having access to the buffer, the plurality of producer threads and plurality of consumer threads including the executing thread.

6. The system of claim 5, wherein each of the producer threads stores different data in different records of the buffer, and each of the consumer threads retrieves different data from different records of the buffer.

7. The system of claim 1, wherein the executing thread comprises a producer thread from among a plurality of producer threads subscribed to publish data to the buffer.

8. The system of claim 1, wherein the executing thread comprises a consumer thread from among a plurality of consumer threads subscribed to consume data from different records of the buffer.

9. The system of claim 1, wherein the header includes the state of the record and a pointer value set by a last thread modifying the state of the record.

10. The system of claim 1, wherein the updated state is one of the filling state or the draining state.

11. The system of claim 1, wherein the data operation comprises one of:
a data write operation storing data from the producer into the record; or
a data read operation obtaining data from the record by the consumer.

12. A method of storing data into a lock-free ring buffer, the method comprising:
concurrently performing one or more storage operations on one or more of a plurality of records in the lock-free ring buffer, wherein performing a storage operation on a record in the buffer includes:
  loading a shared producer pointer by a producer thread, the lock-free ring buffer having the plurality of records located at corresponding index values, the shared producer pointer being useable by a plurality of producer threads including the producer thread;
  calculating an index from the shared producer pointer to the record into which data is to be stored;
  obtaining a header of the record;
  based on the header, determining a state of the record to be processed, the state selected from among a plurality of states, including: a filled state, a filling state, a drained state, and a draining state,
    wherein the state of the record transitions cyclically among the plurality of states, wherein drained state is followed by the filling state, the filling state is followed by the filled state, and the filled state is followed by the draining state; and
    wherein the plurality of records includes a first record with a first state and a second record with a second state each from among the plurality of states, and wherein the first state is different from the second state;
  creating a candidate header including an updated state of the record to be processed, the updated state indicating that the record is in use by the producer thread;
  performing a compare-and-swap (CAS) atomic operation to update the header of the record to the candidate header; and
  upon successful completion of the atomic operation to update the header of the record to the candidate header, performing the storage operation in which the producer thread stores data into the record.

13. The method of claim 12, wherein the storage operation includes:
  incrementing the shared producer pointer;
  storing the data into the record;
  creating a second candidate header including a third state of the record, the third state indicating that the record is available to be accessed by a consumer thread; and
  swapping the second candidate header into the record.

14. The method of claim 13, wherein the state of the header comprises the drained state, and the updated state comprises the filling state.

15. The method of claim 14, wherein the third state comprises the filled state.

16. The method of claim 13, wherein the second candidate header includes a value of the shared producer pointer.

17. A method of retrieving data from a a lock-free ring buffer, the method comprising:
  concurrently performing one or more read operations on one or more of a plurality of records in the lock-free ring buffer, wherein performing a read operation on a record in the lock-free ring buffer includes:
    loading a shared consumer pointer by a consumer thread, the lock-free ring buffer having the plurality of records located at corresponding index values, the shared consumer pointer being useable by a plurality of consumer threads including the consumer thread;
    calculating an index from the shared consumer pointer to the record into which data is to be stored;
    obtaining a header of the record;
    based on the header, determining a state of the record to be processed, the state selected from among a plurality of states, including: a filled state, a filling state, a drained state, and a draining state,
      wherein the state of the record transitions cyclically among the plurality of states, wherein drained state is followed by the filling state, the filling state is followed by the filled state, and the filled state is followed by the draining state; and
      wherein the plurality of records includes a first record with a first state and a second record with a second state each from among the plurality of states, and wherein the first state is different from the second state;
    creating a candidate header including an updated state of the record to be processed, the updated state indicating that the record is in use by the consumer thread;
    performing a compare-and-swap (CAS) atomic operation to update the header of the record to the candidate header; and
    upon successful completion of the atomic operation to update the header of the record to the candidate header, performing the read operation in which the consumer thread reads data from the record.

18. The method of claim 17, wherein the state of the header comprises the filled state, and the updated state comprises the draining state.

19. The method of claim 17, wherein the read operation includes:
  incrementing the shared consumer pointer;
  reading the data from the record;
  creating a second candidate header including a third state of the record, the third state comprising a drained state indicating that the record is available to be accessed by a producer thread; and
  swapping the second candidate header into the record.

* * * * *